Figure 10:
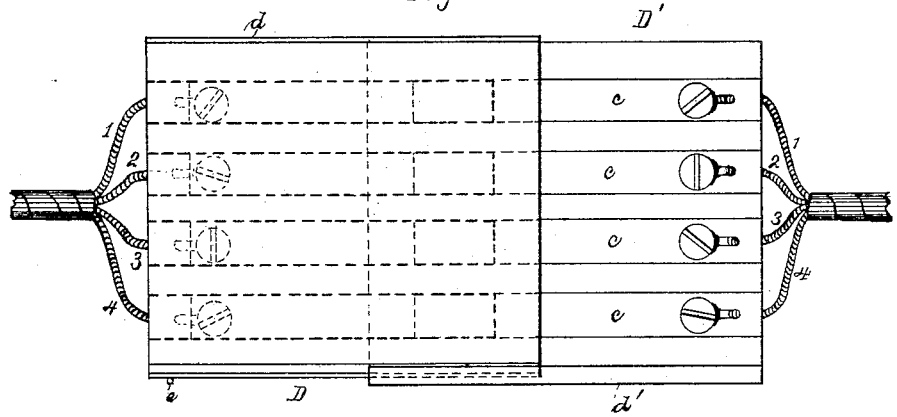

(No Model.)
W. A. STERN.
SYSTEM OF LIGHTING RAILWAY TRAINS BY ELECTRICITY.
No. 346,388. Patented July 27, 1886.
5 Sheets—Sheet 1.
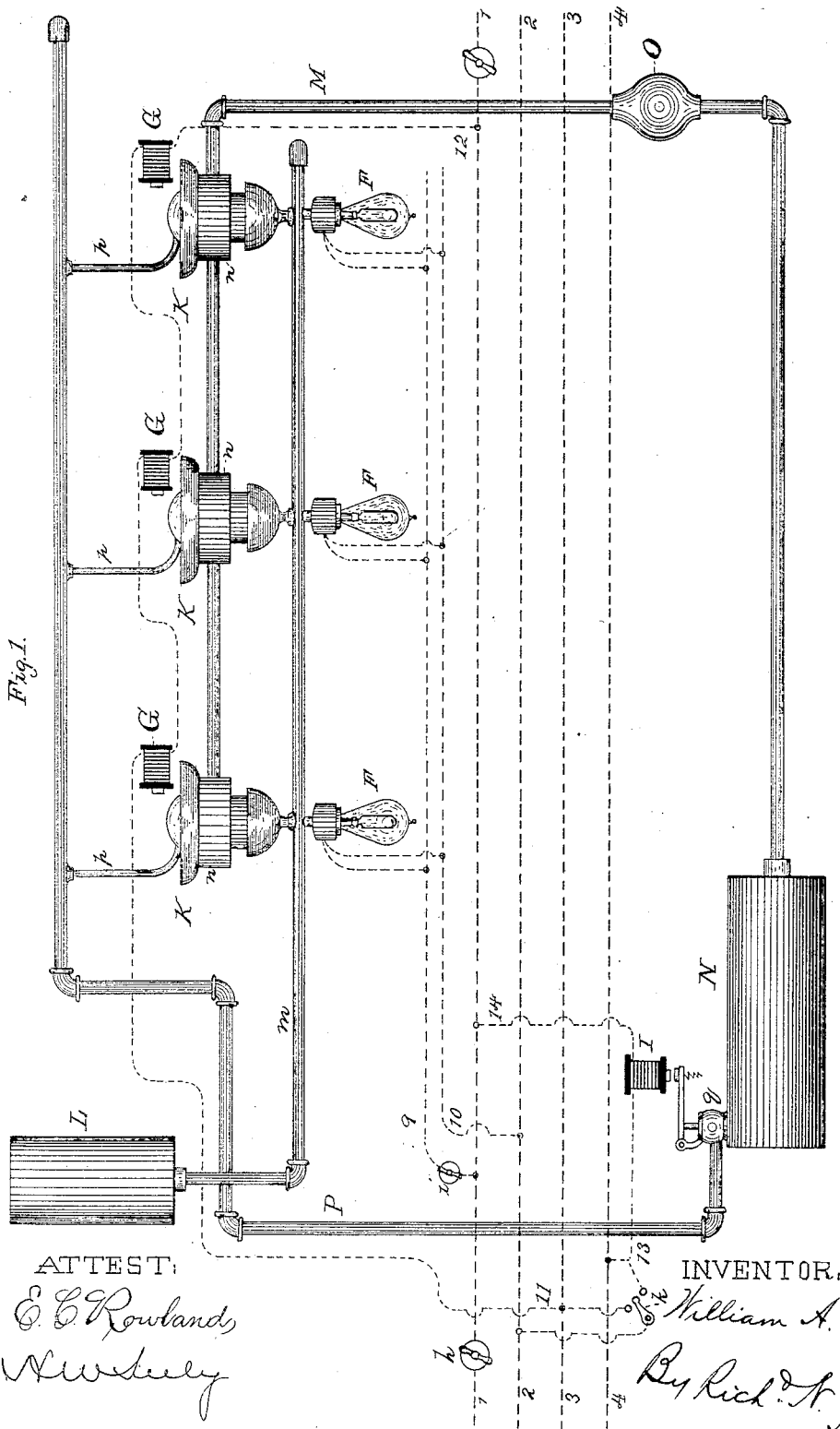

(No Model.)  5 Sheets—Sheet 2.
W. A. STERN.
SYSTEM OF LIGHTING RAILWAY TRAINS BY ELECTRICITY.
No. 346,388.  Patented July 27, 1886.
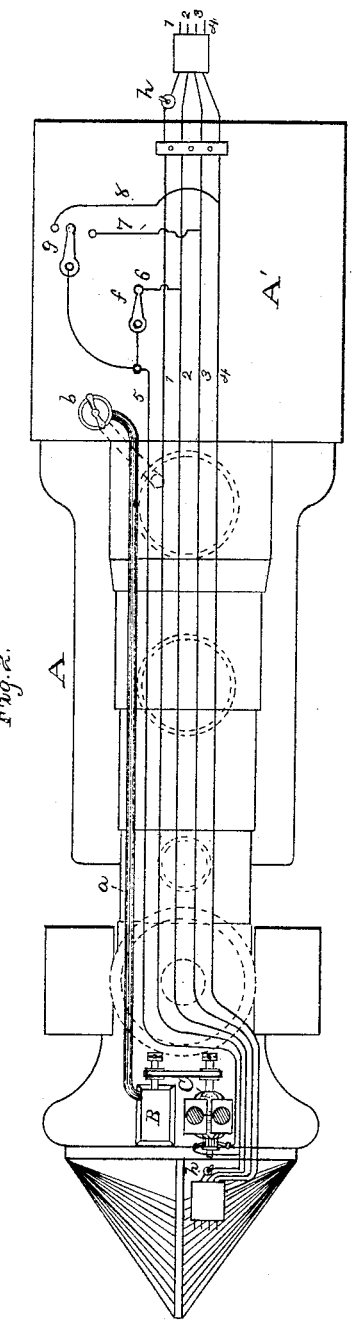
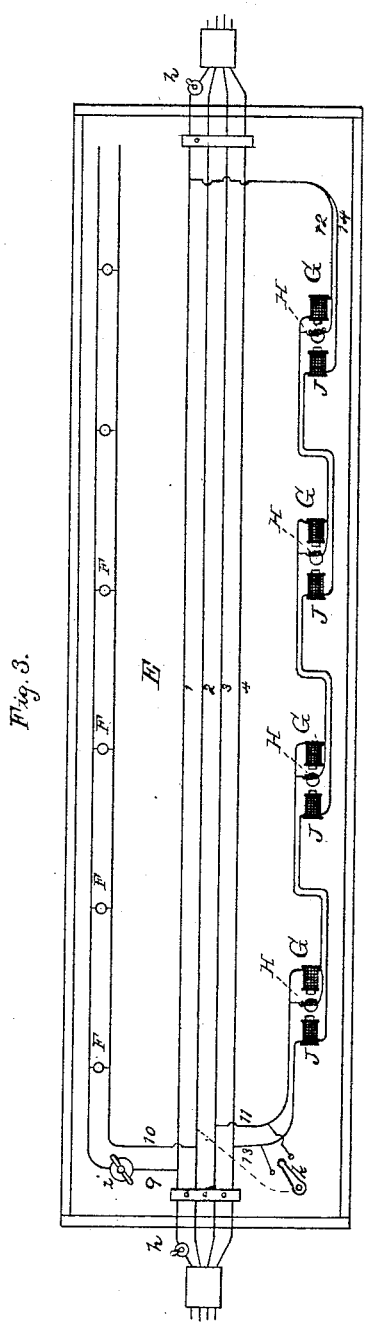
ATTEST:  INVENTOR:

(No Model.)  5 Sheets—Sheet 3.
W. A. STERN.
SYSTEM OF LIGHTING RAILWAY TRAINS BY ELECTRICITY.
No. 346,388. Patented July 27, 1886.
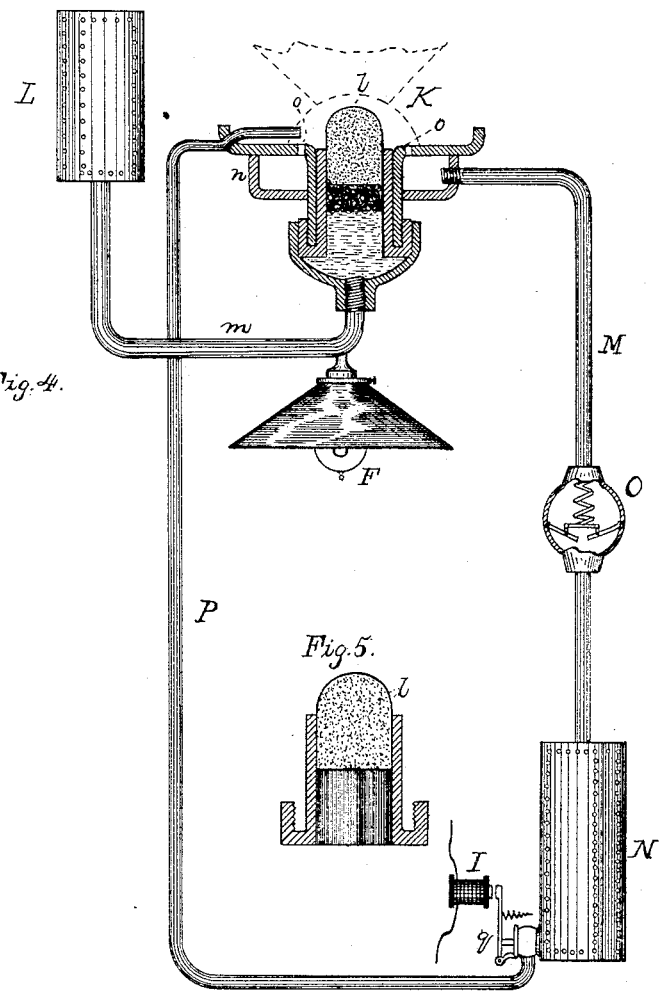
ATTEST:
E. C. Rowland
H. W. Seely
INVENTOR:
William A. Stern,
By Rich'd N. Dyer,
Atty.

(No Model.) 5 Sheets—Sheet 4.
W. A. STERN.
SYSTEM OF LIGHTING RAILWAY TRAINS BY ELECTRICITY.
No. 346,388. Patented July 27, 1886.
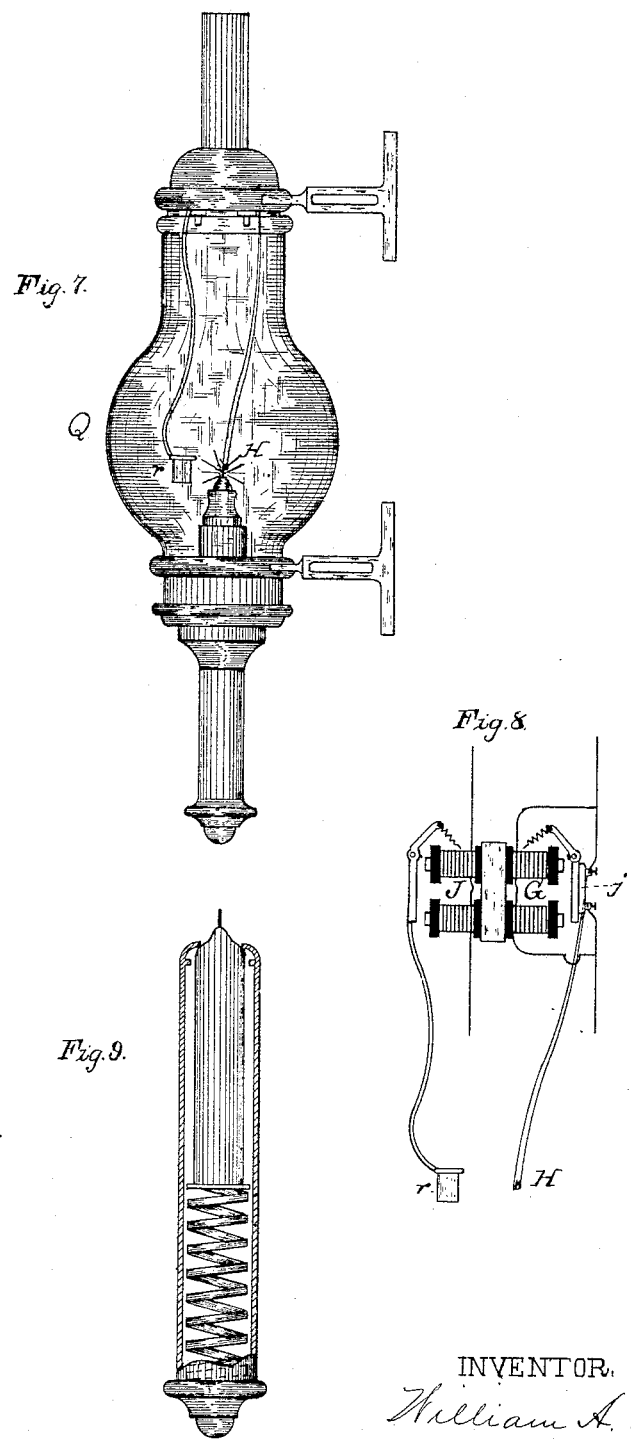
ATTEST: INVENTOR,
E. C. Rowland, William A. Stern,
V. W. Seely By Rich'd N. Dyer,
 Atty.

(No Model.)　　　　　　　　　　　　　　　　　　　5 Sheets—Sheet 5.
W. A. STERN.
SYSTEM OF LIGHTING RAILWAY TRAINS BY ELECTRICITY.
No. 346,388.　　　　　　　　　　　Patented July 27, 1886.

UNITED STATES PATENT OFFICE.

WILLIAM A. STERN, OF MENLO PARK, ASSIGNOR TO HIMSELF, AND THOMAS A. EDISON, OF LLEWELLYN PARK, NEW JERSEY.

SYSTEM OF LIGHTING RAILWAY-TRAINS BY ELECTRICITY.

SPECIFICATION forming part of Letters Patent No. 346,388, dated July 27, 1886.

Application filed November 18, 1882. Serial No. 77,086. (No model.)

*To all whom it may concern:*

Be it known that I, WILLIAM A. STERN, of Menlo Park, in the county of Middlesex and State of New Jersey, have invented a certain new and useful Improvement in Systems of Lighting Railway-Cars by Electricity, of which the following is a specification.

My invention relates to a system of lighting a train of railway-cars by electricity, wherein an independent steam-engine is mounted upon the locomotive or other car of the train, receiving steam from the locomotive-boiler, and serves to operate a dynamo or magneto electric machine, which is connected with a lamp-circuit extending throughout the train, the lamps being of the incandescing form, and being located in independent, derived, or multiple-arc circuits. The engine operating the electrical generator is worked independently of the movement of the train, and supplies the lamps while the train is at rest as well as while it is in motion. By this system the source of electrical energy is certain and of constant electro-motive force, the necessity of using secondary batteries, which have many disadvantages, being avoided.

The object I have in view is to provide in such a system an auxiliary light, which can be employed upon the separate cars when the train is broken up or before the locomotive is attached, or upon any car that is detached from the train, and to provide means for lighting and extinguishing the electric lamps, as desired, and also for lighting and extinguishing the auxiliary lights before the train is broken up, such means being controlled by the engineer for the whole train, and being also arranged so that the lighting and extinguishing devices for each car may be operated at the car itself, and my object is further to produce means for coupling the circuit-wires of the several cars together and preventing spark or the danger of a cross or short circuit in making the connections between the cars, and also to produce such an arrangement and construction of all the parts that the system will be efficient and convenient in operation.

The means for carrying the invention into effect are shown in the accompanying drawings, in which—

Figure 1 is a view of the principal parts of the apparatus for a car, the circuits being shown diagrammatically in dotted lines; Fig. 2, a representation of a locomotive provided with the independent steam-engine and the electrical generator, a diagram of the connections being shown; Fig. 3, a representation of a car, with a diagram of the electric-light circuits and of the circuits for operating the devices for lighting and extinguishing the auxiliary lights; Fig. 4, an elevation and partial section of an oil-lamp used as an auxiliary light, with the means for supplying the same with oil, for feeding air thereto, and for extinguishing the light; Fig. 5, a vertical section, on a larger scale, of the non-combustible wick of the lamp; Fig. 6, a top view, partly diagrammatic, of the lighting device; Fig. 7, an elevation of the candle-lamp used as the auxiliary light; Fig. 8, a separate view of the devices for lighting and extinguishing the candle; Fig. 9, a vertical section of the candle-socket; Fig. 10, a top view of the coupling for the circuit-wires, the two sections being partially separated; and Fig. 11, a side view of the same.

A, Fig. 2, represents a railway-locomotive, upon which is mounted the separate steam-engine B, at any suitable point, the engine being supplied from the boiler of the locomotive through pipe $a$, which is provided with the throttle-valve $b$, located within the cab A' of the locomotive, as shown.

C is the dynamo or magneto electric machine, connected with and operated by the engine B independently of the movement of the locomotive.

Figure 11:
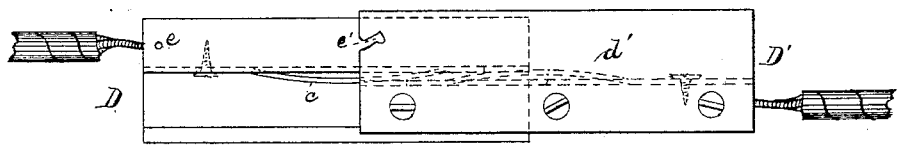

1 2 3 4 are the circuit-wires extending from end to end of the locomotive and of each car of the train, and terminating at each end of the locomotive, and at each end of every car in one section of the coupling device, which is composed of two similar parts, D D', Figs. 10 and 11. Each of these parts is a flat block of insulating material, having four grooves, in which are laid plate-springs $c$. These springs are secured at one end to the insulating-block, and are there connected with the circuit-wires 1 2 3 4. The springs are free at their other ends, and are bent outwardly at their centers. The parts D D' are provided with side plates, $d\ d'$, which overlap the opposing edges of the parts and engage with grooves in such parts. A pin, e, on one part engages with an oblique slot, e', in the side plate of the opposing part and locks the parts together. One pole of the generator C is connected directly with the circuit-wire 1, while the other pole is connected with a wire, 5, extending into the cab A'. Wire 5 is connected by switch f with wire 6, running to the circuit-wire 2, and by switch g with either one of two wires, 7 and 8, running to circuit-wires 3 4, respectively.

By operating switch g the engineer can at pleasure light the auxiliary lamps throughout the train or extinguish them through the devices about to be described, the first operation being performed by throwing g onto 7, and the second by throwing g onto 8.

By operating switch f and making and breaking the connection between 5 and 2, the circuit of the electric lamps throughout the train can be made and broken at the pleasure of the engineer.

Back of the coupling at each end of each car one of the circuit-wires 1 2 is provided with a switch, h, Figs. 1, 2, and 3, by which the dynamo-circuit of the car or locomotive can be broken back of the coupling before the circuit-wires of the cars are connected or disconnected.

Within each car E of the train an electric-lamp circuit, 9 10, is taken from 1 2, Figs. 1 and 3, and in this circuit incandescing electric lamps F are arranged in multiple arc, such lamps being arranged in desired locations in the car and supported in any suitable way. The circuit 9 10 is provided with a hand-switch, i, by which the circuit can be made and broken in each car.

For the auxiliary light I may use either oil or candle lamps.

With either form of auxiliary lamp, devices operated by the electric current are provided for lighting and extinguishing. For this purpose in each car a circuit, 11 12, extends from the circuit-wire 3 to 1, including for each lamp an electro-magnet, G, and an incandescing conductor, H, which is preferably a platinum coil. The coil H is carried by the armature j of the magnet, Figs. 6 and 8, which armature is retracted by a spring holding H away from the wick of the lamp or candle. The completion of the circuit 11 12 raises the coil H to incandescence, and the magnet at the same time draws the coil over or against the wick, igniting the same. The breaking of circuit 11 12 stops the flow of current through the coils H and the magnets G, and the coils resume their normal position away from the wicks.

All the lighting-circuits 11 12 throughout the train can be made or broken simultaneously by the engineer by moving the switch g, so as to connect or disconnect the wires 5 and 3.

In each car a switch, k, is provided for connecting 2 with 1 through circuit 11 12, so that the conductor or a brakeman can light the auxiliary lamps at the car itself, should it be desirable to do so for any reason.

Within each car there is another circuit, 13 14, extending from circuit-wire 4 to 1. This includes the devices for extinguishing the auxiliary lights. I may employ either of two forms of extinguishing devices. Air-jets may be used to blow out the lights, or extinguishing-caps or snuffers may be employed. With the air-jets the circuit 13 14 will include one electro-magnet, I, Figs. 1 and 4, for operating a cock or valve, while with the extinguishing-caps or snuffers an electro-magnet, J, Figs. 3 and 8, for each lamp will be employed.

Either form of extinguishing device may be used with the oil-lamps, as well as with the candle-lamps; but for convenience I have shown the air-jets as used in connection with the oil-lamps and the caps or snuffers as used in connection with the candle-lamps, and will so describe them in detail.

The auxiliary lights throughout the train may be extinguished at pleasure by the engineer by moving switch g so as to connect 4 and 5, and complete all the circuits 13 14 through circuit-wire 4.

In each car there is a connection running from 13 14 to a contact-plate, upon which the switch k may be moved, thus completing the extinguishing-circuit at the individual car.

K represents the oil-lamps, Figs. 1 and 4, having preferably a non-combustible wick, l, of carbon, asbestus, or other suitable material, placed at the upper end of a suitable lamp-body, and having a body of cotton or other good absorbent placed directly below it.

All the lamps are supplied with oil from an elevated reservoir, L, through a pipe, m.

To avoid the use of chimneys with the oil-lamps each lamp-body is surrounded by an air-jacket, n, having a circle of vertical air-holes o around the wick. This jacket is connected with an air-pipe, M, extending to the air-brake reservoir N of the car.

To produce a constant pressure of the air in the lamp-jackets and reduce the pressure to a point below that of the air-brake reservoir a pressure-reducer, O, is arranged between the air-brake reservoir N and the lamps. This pressure-reducer is of any ordinary or suitable construction.

The constant stream of air forced upwardly around the wicks keeps the lights steady without the use of chimneys, and the utilization of the air-brake reservoir for supplying this air-feed and the intermediate pressure-reducer makes an exceedingly convenient and simple construction.

To extinguish the oil-lamps a pipe, P, extends from the air-brake reservoir N of each car, and has a branch, p, running to each lamp, and terminating close to the base of the flame. The connection of the pipe P with reservoir N is kept normally closed by a spring-valve, q. This valve is opened by the electro-magnet I when the circuit 13 14 is completed, and the lamps are extinguished by the air-jets, the valve closing itself when the circuit of the magnet I is broken.

Q, Fig. 7, is the candle-lamp. These are of the usual construction, the candles being held in a spring-socket and forced upwardly as consumed, so as to keep the light at the same point.

The electro-magnets G J, for lighting and extinguishing, are placed preferably in the top or hood of the lamp or lantern, the extinguishing-cap or snuffer r and the coil H being carried by downwardly-extending arms.

With the extinguishing-cap or snuffer each lamp would have a magnet, J, as shown in Fig. 3, and upon the completion of circuit 13 14 all the magnets J will be energized, each moving a cap or snuffer and extinguishing one of the lamps.

I do not claim herein the extinguishing-cap with the electro-magnet controlling the same, since this will form the subject of a separate application for Letters Patent.

What I claim is—

1. A system of lighting a train of railway-cars by electricity, wherein are combined an independent steam-engine supplied from the locomotive-boiler, a dynamo or magneto electric machine operated by such independent engine, electric lamps in each car connected with such generator, and an auxiliary light in each car, substantially as set forth.

2. The combination of electric lamps, auxiliary lights, a source of electricity supplying said electric lamps, and electrical devices for lighting said auxiliary lights supplied from the same source, substantially as set forth.

3. The combination of electric lamps, auxiliary lights, a source of electricity, a circuit therefrom for supplying said electric lamps, another circuit from the same source, including electrically-operated devices for lighting said auxiliary lights, and a circuit-controller for each of said circuits, substantially as set forth.

4. The combination of electric lamps, auxiliary lights, a source of electricity, a circuit therefrom for supplying said electric lamps, another circuit from the same source, including electrically-operated devices for extinguishing said auxiliary lights, and a circuit-controller for each of said circuits, substantially as set forth.

5. The combination of electric lamps, auxiliary lights, a source of electricity for supplying said electric lamps, electrical devices for lighting said auxiliary lights supplied from the same source, and electrical devices for extinguishing said auxiliary lights, also supplied from the same source, substantially as set forth.

6. A system for lighting a train of railway-cars, wherein are combined electric lamps, auxiliary lights, a source of electricity supplying said electric lamps, electrical devices for lighting and extinguishing said auxiliary lights supplied from the same source, and means on the locomotive for controlling the electric lamps and said lighting and extinguishing devices, substantially as set forth.

7. A system for lighting a train of railway-cars, wherein are combined electric lamps, auxiliary lights, a source of electricity, a circuit therefrom for supplying said electric lamps, another circuit from the same source, including electrically-operated devices for lighting said auxiliary lights, another circuit from the same source, including electrically-operated devices for extinguishing said auxiliary lights, and switches on the locomotive for controlling all said circuits, substantially as set forth.

8. A system for lighting a train of railway-cars by electricity, wherein are combined an independent steam-engine, supplied from the locomotive-boiler, a generator of electricity operated by said independent steam-engine, one or more electric lamps in each car supplied with current by said generator, one or more auxiliary lights in each car, electrical devices for lighting said auxiliary lights supplied from said generator, and electrical devices for extinguishing said auxiliary lights, also supplied from the same generator, substantially as set forth.

9. A system of lighting a train of railway-cars by electricity, wherein are combined electric lamps, means for supplying them with an electric current, auxiliary lights, means for lighting or extinguishing the auxiliary lights, operated by the current, and means on each car for controlling such lighting or extinguishing devices, substantially as set forth.

10. The combination, with a train of railway-cars, of electric lamps, means for supplying them with an electric current, auxiliary lights, means for lighting or extinguishing the auxiliary lights, operated by the current, means upon the locomotive for controlling the lighting or extinguishing devices, and means upon each car for controlling such lighting or extinguishing devices, substantially as set forth.

11. The combination, with a railway-car, of a source of electrical energy, electric lamps, auxiliary lamps, a circuit containing such electric lamps, and incandescing conductors and electro-magnets, located in another circuit, supplied from the same source, the closure of the latter circuit causing the conductors to become incandescent, and to be moved by the magnets into contact or igniting proximity with the auxiliary lamps, substantially as set forth.

12. The combination, with lamps, of air-jets for extinguishing such lamps, an air-reservoir supplying the air-jets, and means controlled by an electric current for opening and closing the connection with the air-reservoir, substantially as set forth.

13. The combination, with a railway-car, of a source of electrical energy, electric lamps, auxiliary lamps, air-jets for extinguishing the auxiliary lamps, a connection with the air-brake reservoir for supplying such jets, and means for opening and closing such connection with the air-reservoir, substantially as set forth.

14. The combination, with a railway-car, of oil-lamps in said car, the air-brake reservoir, air-feeding pipes extending from said reservoir to said lamps, and an intermediate pressure-reducer between said reservoir and said lamps, substantially as set forth.

This specification signed and witnessed this 9th day of November, A. D. 1882.

WILLIAM A. STERN.

Witnesses:
WM. H. MEADOWCROFT,
H. W. SEELY.